United States Patent Office 3,748,278
Patented July 24, 1973

3,748,278
PROCESS AND AGENTS HAVING AN INFLUENCE
ON THE WEATHER
Rudolf Kühne, Frankfurt am Main, Helmut Diery, Kelkheim, Taunus, and Siegbert Rittner, Frankfurt am Main, Germany, asssignors to Farbwerke Hoechst Aktiengesellschaft vormals Meister Lucius & Bruning, Frankfurt am Main, Germany
No Drawing. Filed Aug. 31, 1971, Ser. No. 176,696
Claims priority, application Germany, Sept. 2, 1970,
P 20 43 497.3
Int. Cl. B01d 17/00; E01h 13/00
U.S. Cl. 252—319                                    5 Claims

ABSTRACT OF THE DISCLOSURE

Water-soluble condensation products of (a) a phenolic compound having sulfo groups or a mixture thereof, (b) a compound having an urea structure, and (c) formaldehyde or a compound capable of setting free formaldehyde are effective in dispelling fog or clouds or causing rain.

---

The present invention relates to a process and to agents having an influence on the weather.

It is known that the autumn and winter months are an especially critical period for civil air traffic because of the formation of fog. Despite many attempts to dispel the fog by physical, chemical and mechanical means, a satisfactory solution of this problem has not yet been found. Surface-active agents as described in German patent specification No. 956,278 and in U.S. patent specification No. 2,962,450 have neither been suitable for solving the fog-dispelling problem.

Now it was found that surprisingly water-soluble condensation products of (a) a phenolic compound containing sulfo groups or mixtures of such compounds
(b) a compound having an urea structure, and
(c) formaldehyde or compounds capable of setting free formaldehyde have properties enabling them to reduce and to remove clouds and to make them rain and, especially, to dispel fog.

As phenolic compounds containing sulfo groups there may especially be used aromatic mono- or dihydroxy compounds in which the aromatic nucleus may contain further substituents, especially halogen atoms, preferably chlorine atoms, alkyl or alkoxy groups, preferably lower alkyl radicals or alkoxy radicals having from 1 to 4 carbon atoms. As an example of particularly suitable phenols the sulfonating products of which are used alone or in the form of technical-grade mixtures for the preparation of the agents to be used according to the invention there may be mentioned: Mononuclear phenols, especially cresols, xylenols, butylphenols, halogenphenols and the phenol itself, bisphenols, such as 4,4-dihydroxydiphenyl, 4',4''-dihydroxydiphenylpropane-(2,2), 4,4'-dihydroxydiphenylsulfone, naphthols, lower alkyl naphthols, polyhydric phenols, such as resorcinol, pyro-catechol (ortho-dihydroxybenzene), hydroquinone, the homologs thereof and their monoalkyl ethers having from 1 to 4 carbon atoms in the alkoxy groups, such as the methyl, ethyl and propyl ethers of pyrocatechol. It is also possible to sulfonate already sulfonated phenols as described above or the corresponding sulfomethylation products.

Suitable ureas are, besides urea itself, methylol urea, such as N,N'-dimethylol urea, tetramethylol urea, ethylenebismethylol urea, etherified methylol ureas, particularly derivatives of lower alkanols, such as dimethoxy dimethylol urea, methoxy-dimethylol urea or dibutoxy-dimethylol urea. Instead of urea, there may also be used preformed water-soluble urea-formaldehyde condensates which are, optionally, partially etherified.

The formaldehyde required for the preparation of the condensates of the invention may be used in gaseous form, as aqueous solution (formalin) or in the form of an agent yielding formaldehyde, such as paraformaldehyde, trioxymethylene, hexamethylene-tetramine or a semi-acetal from formaldehyde and a short-chained alcohol, preferably a lower alkanol.

The compounds can be used and are effective alone or together with other compounds capable of dispelling fog, particularly with urea. The condensation products and their mixtures are preferably used in powder form having a particle size of from about 1 to $50\mu$, advantageously with a particle size of from 5 to $20\mu$.

The condensation products according to the invention are obtained in known manner when the sulfonated phenolic compounds or a mixture of sulfonated phenolic compounds are reacted in any order with urea or preformed water-soluble urea-formaldehyde condensates which are, optionally, partially etherified, and with formaldehyde or compounds setting free formaldehyde in an acidic aqueous medium at a temperature of from about 20 to about 120° C., preferably from about 40 to about 100° C. The condensation may be carried out in various forms and orders. Thus, for example, a sulfonic acid or a sulfonic-acid salt of a phenolic compound or a mixture thereof may be reacted in a first stage with a preformed water-soluble urea-formaldehyde precondensate which may, optionally, be etherified and in a second stage the condensate thus obtained may be treated in an acidic aqueous solution with a phenolic compound and formaldehyde.

The condensation products obtained as aqueous solutions can easily be pulverized after neutralization, for example with alkali metal hydroxides or ammonia, by means of known processes, such as spray or roller drying.

The quantitative ratio of the starting components may vary within wide limits. Thus, about 0.5–3 mols of urea or of a water-soluble urea-formaldehyde condensate and about 3–5.5 mols of formaldehyde may be used per 1–2.5 mols of the phenolic compound containing sulfo-groups.

The compounds of the invention are distinguished, besides a good efficiency for dissolving fog, by the fact that they are non-toxic and non-corrosive toward the metal alloys used in automobile and, above all, in airplane construction.

When using the compounds in combination with other substances influencing the weather, in particular those capable of dispelling fog, the portion of the agents according to the invention may be chosen within the range of from 10 to 90%. A mixture of about 20–80% of the compounds in accordance with the invention with the or each other mixed component(s) is preferred. Urea is used as mixed component with particular advantage.

In the following, the preparation of the condensation products according to the invention and their use are explained; the parts and percentages being by weight, unless stated otherwise.

CONDENSATION PRODUCT 1

500 parts of phenol were heated with 550 parts of a 98% sulfuric acid at 98–100° C. for 3.5 hours. Then, the solution was cooled to 50° C. and 200 parts of water and 360 parts of urea were added to the reaction mixture. 940 parts of 30% aqueous formaldehyde were gradually added at 50–55° C. while stirring. Then, 380 parts of 50% aqueous sodium hydroxide solution and 750 parts of phenol sulfonic acid prepared as described above were added and the solution was condensed by gradual addition of 300 parts of formaldehyde at 20–40° C. until no more formaldehyde smell was perceptible and the condensate was entirely water-soluble. Then, the solution was neutralized with about 500 parts of 50% sodium hydroxide solution and the condensate solution was converted into a powder by means of spray drying.

CONDENSATION PRODUCT 2

500 parts of phenol were heated at 98–100° C. for 4 hours with 550 parts of 98% sulfuric acid. Then, the reaction product was cooled to 40–60° C. and a solution of 650 parts of dimethylol urea and 400 parts of water were gradually introduced. As soon as the solution was clear, 200 parts of 50% aqueous sodium hydroxide solution and 360 parts of the sulfonated phenol mentioned were added and the solution was further condensed at 20–45° C. by the addition of 300 parts of 30% formaldehyde until no more formaldehyde smell was perceptible and the condensate was entirely water-soluble. Then, the solution was neutralized with about 300 parts of 50% sodium hydroxide solution and sprayed to yield a powder by means of spray drying.

CONDENSATION PRODUCT 3

700 parts of a sodium salt of the p,p'-dihydroxydiphenyl sulfonic acid were mixed with 800 parts of water while stirring and acidified with 100 parts of concentrated hydrochloric acid. At 65 to 80° C., 135 parts of a 70% aqueous mixture of dimethylol urea in which 25% of the methylol groups were etherified with methanol, were gradually introduced into the solution. After stirring for 2 hours 120 parts of phenol sulfonic acid were added to the reaction mixture which was condensed at 35–55° C. by the addition of 120 parts of 30% formaldehyde until the product was clearly soluble in water. After neutralization with about 80 parts of 50% sodium hydroxide solution the condensation product was converted into a powder by spray drying.

COMBINATION OF CONDENSATION PRODUCT 1 AND UREA (COMBINATION 1)

40 parts of condensation product 1 were completely dissolved in water with 60 parts of urea and converted at an input temperature of 180° C. as 40% aqueous solution by means of spray drying into a fine powder having a particle size of 5 to 30$\mu$.

COMBINATION OF CONDENSATION PRODUCT 2 AND UREA (COMBINATION 2)

50 parts of condensation product 2 were intimately mixed with 50 parts of urea and ground in an air jet mill (type "Micronizer") having a throughput of 10 kg. of product per hour in such a manner that a product having a particle size of 10–20$\mu$. was obtained.

The condensation products and their combinations described in the examples show an excellent efficiency as to the removal of fog.

The dissemination of the condensation product of the invention or their combinations in the foggy space to remove the fog may be varied within relatively wide limits of from about 1 mg./m.$^3$ to 100 mg./m.$^3$. It is comprehensive, however, that the effectively required amount must be found, as the case may be, on the basis of meteorological parameters, for example wind speed.

To carry out the process in accordance with the invention, different equipments may be used. For example, one or several helicopters or small airplanes may be used for spraying the products of the invention into the fog; alternatively, the particles may be introduced or shot into the fog from the ground, for example with large sized ventilators or blast apparatuses. Furthermore, pressurized gases such as compressed air, $CO_2$, $N_2$ or low-molecular fluorinated hydrocarbons may also serve as propellants for the compounds of the invention.

EXAMPLE 1

5 g. of the product of combination 1 were introduced into a natural fog in which marked sticks were installed along an axis, the visibility being 3 m. (fog density 2–3 g./m.$^3$) and the temperature being 10° C.; this operation was carried out from a 10 m. altitude started from the first stick in the direction of the axis of the sticks by means of a spraying apparatus also used in agriculture for spraying insecticides. Within about 10 minutes, an improvement of visibility in the fog up to about 18 m. was obtained.

In an analogous manner, the product of combination 2 showed similar good effects.

EXAMPLE 2

According to the process described in Example 1, 5 g. of condensation product 1 having a particle size of 10–20$\mu$ were sprayed into a natural fog having a visibility of 3 m. (fog-density: 2–3 g./m.$^3$) and a temperature of 10° C.

Within 10 minutes, the visibility in the fog could be improved up to 12 m. Condensation products 2 and 3 having a particle size of 10–20$\mu$ showed similar good effects.

EXAMPLE 3

The product of combination 1 which was ground by means of an air jet mill to a particle size of 8–20$\mu$ was sprayed from an airplane via a spray system according to the venturi principle on a cumulus cloud of 30–50 m. thickness in an altitude of 1000 m. After a few minutes the cloud was dispelled.

We claim:
1. A process for dispelling fog, which comprises contacting the fog with a water-soluble condensation product of
   (a) a sulfo derivative of phenol, lower-alkyl phenol, halophenol, a compound of the formula

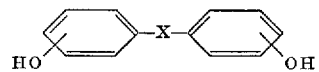

in which X is a direct bond, lower alkylene or sulfone; naphthol, lower alkylnaphthol, dihydroxybenzene or dihydroxybenzene-lower alkyl ether,
   (b) urea, mono- to tetrakis-(methylol)-urea, N,N'-bis-(hydroxymethyl) - imidazolidinone - (2), lower alkyl ether of mono- to tetrakis-(methylol)-urea or N,N'-bis - (hydroxymethyl) - imidazolidinone - 2, a water-soluble urea-formaldehyde condensate or a water-soluble urea-formaldehyde condensate etherified with lower alkanol, and
   (c) formaldehyde, paraformaldehyde, trioxymethylene, hexamethylene-tetramine or a semi-acetal from formaldehyde and a lower alkanol.

2. The process as claimed in claim 1, wherein the condensation product is used in admixture with about 10 to about 90% of its weight of urea.

3. The process as claimed in claim 1, wherein the condensation product is used in admixture with about 20 to about 80% of its weight of urea.

4. The process as claimed in claim 1, wherein any solid used has a particle size of about 1 to about 50$\mu$.

5. The process as claimed in claim 1, wherein any solid used has a particle size of about 5 to about 20μ.

References Cited

UNITED STATES PATENTS 3,534,906  10/1970  Gensler ............ 239—2 R
3,608,820  9/1971  Kooser ............ 239—2.9

OTHER REFERENCES

Progress in Leather Science, 1920–1945, British Leather Manufacturer's Research Assn. (1948), p. 261.

JOHN D. WELSH, Primary Examiner

U.S. Cl. X.R.

239—2